(12) United States Patent
Poon

(10) Patent No.: US 10,826,551 B2
(45) Date of Patent: Nov. 3, 2020

(54) PROTECTIVE CASE FOR ELECTRONIC DEVICE

(71) Applicant: GRIFFIN TECHNOLOGY, LLC, Irvine, CA (US)

(72) Inventor: Daniel Poon, Nashville, TN (US)

(73) Assignee: GRIFFIN TECHNOLOGY, Irvine, CA (US)

(*) Notice: Subject to any disclaimer, the term of this patent is extended or adjusted under 35 U.S.C. 154(b) by 0 days.

(21) Appl. No.: 15/727,539

(22) Filed: Oct. 6, 2017

(65) Prior Publication Data

US 2018/0191392 A1    Jul. 5, 2018

Related U.S. Application Data

(60) Provisional application No. 62/442,424, filed on Jan. 4, 2017.

(51) Int. Cl.
| | |
|---|---|
| H04B 1/3888 | (2015.01) |
| H04M 1/04 | (2006.01) |
| H04M 1/18 | (2006.01) |
| A45C 11/00 | (2006.01) |

(52) U.S. Cl.
CPC ............ *H04B 1/3888* (2013.01); *H04M 1/04* (2013.01); *H04M 1/185* (2013.01); *A45C 2011/001* (2013.01); *A45C 2011/002* (2013.01); *A45C 2011/003* (2013.01); *A45C 2200/15* (2013.01); *G06F 2200/1633* (2013.01)

(58) Field of Classification Search
CPC .......... A45C 2200/15; A45C 2011/003; A45C 2011/002; A45C 2011/001; H04B 1/3888; H04M 1/04; G06F 2200/1633

USPC .......... 206/320, 45.24, 45.2, 45.23; 248/454, 248/455, 462, 463; 16/352, 353

See application file for complete search history.

(56) References Cited

U.S. PATENT DOCUMENTS

| | | | | |
|---|---|---|---|---|
| 4,223,788 | A * | 9/1980 | Jaeger .................. | B65D 75/366 16/352 |
| 8,820,525 | B1 * | 9/2014 | Zanxiang ............... | F16M 11/10 206/320 |
| 9,072,353 | B2 * | 7/2015 | Fathollahi ............ | A45C 13/002 |
| 2014/0034531 | A1 * | 2/2014 | Wang .................. | H04B 1/3883 206/320 |

(Continued)

*Primary Examiner* — Steven A. Reynolds

(57) ABSTRACT

A protective case for a mobile or portable electronic device is disclosed. The protective case includes a front portion and a back portion that is configured to slide into a side of the front portion to effectuate the sealing and closure of the case. The front portion is configured to cover the front face and sides of the electronic device and includes rails or protrusions on opposing sides of its internal surface. The back portion is configured to cover the back side of the electronic device and includes channels on opposing sides that are configured to be slide along the rails on the opposing sides the internal surface of the front component and thereby open and close the case. The protective case is configured to be reversibly attached to a stand module that facilitates multiple viewing/operating positions. The stand includes a base that is configured to be attached to the case, a hinged stand arm, and a slide cover that locks the hinged stand arm into various configurations that facilitate supporting the protective case and mobile device in multiple viewing/operating positions or orientations.

9 Claims, 17 Drawing Sheets

(56) References Cited

U.S. PATENT DOCUMENTS

| | | | |
|---|---|---|---|
| 2014/0262854 A1* | 9/2014 | Chen | A45C 11/00 206/45.24 |
| 2014/0332418 A1* | 11/2014 | Cheung | F16M 11/10 206/45.2 |
| 2015/0037618 A1* | 2/2015 | Kim | H01M 2/1022 429/7 |
| 2015/0068935 A1* | 3/2015 | Kay | A45C 13/36 206/320 |
| 2016/0113368 A1* | 4/2016 | Tu | H04B 1/3888 206/45.23 |
| 2016/0249472 A1* | 8/2016 | Tu | A45C 11/00 |
| 2018/0041237 A1* | 2/2018 | Mody | H04B 1/3877 |

* cited by examiner

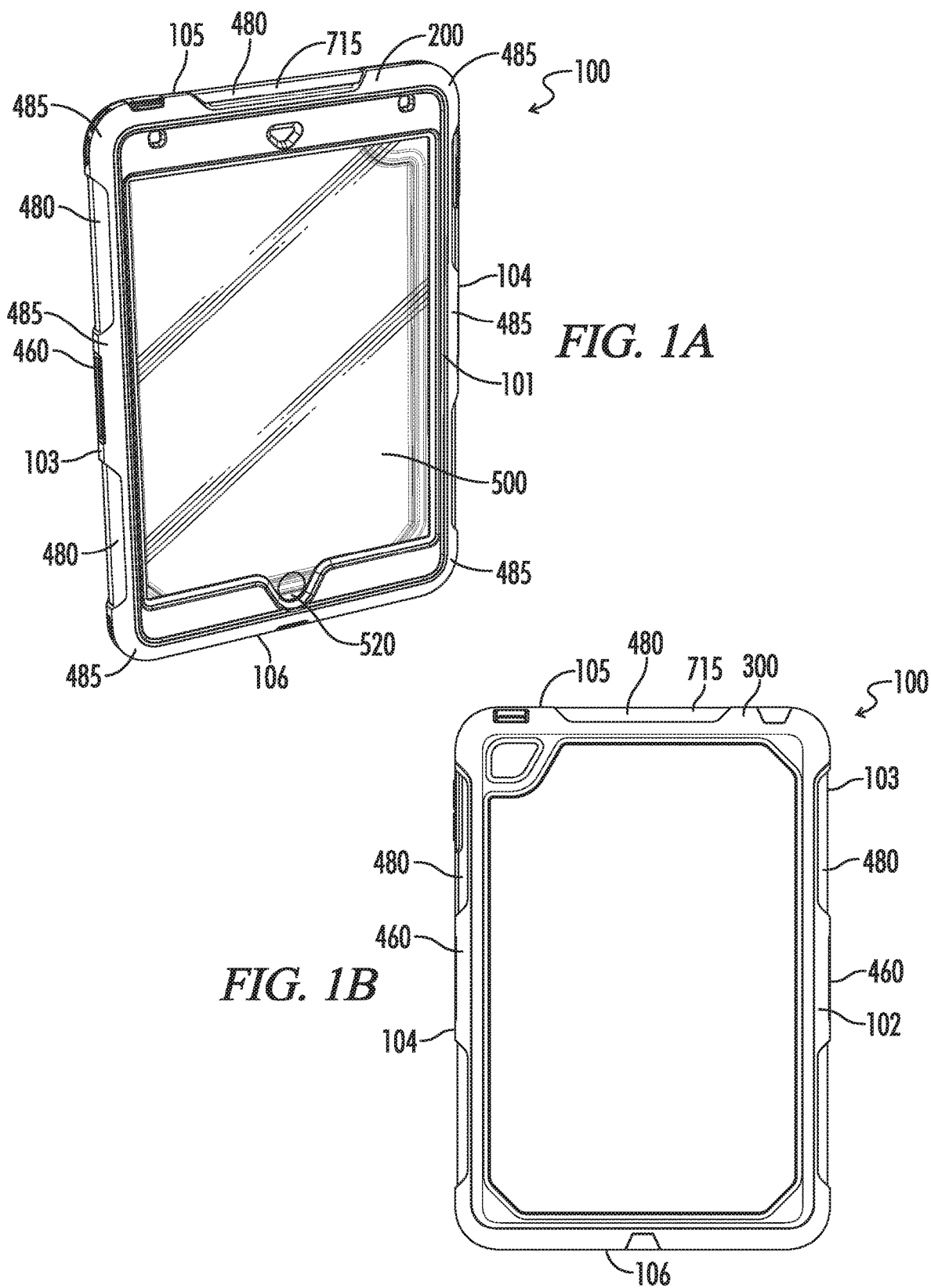

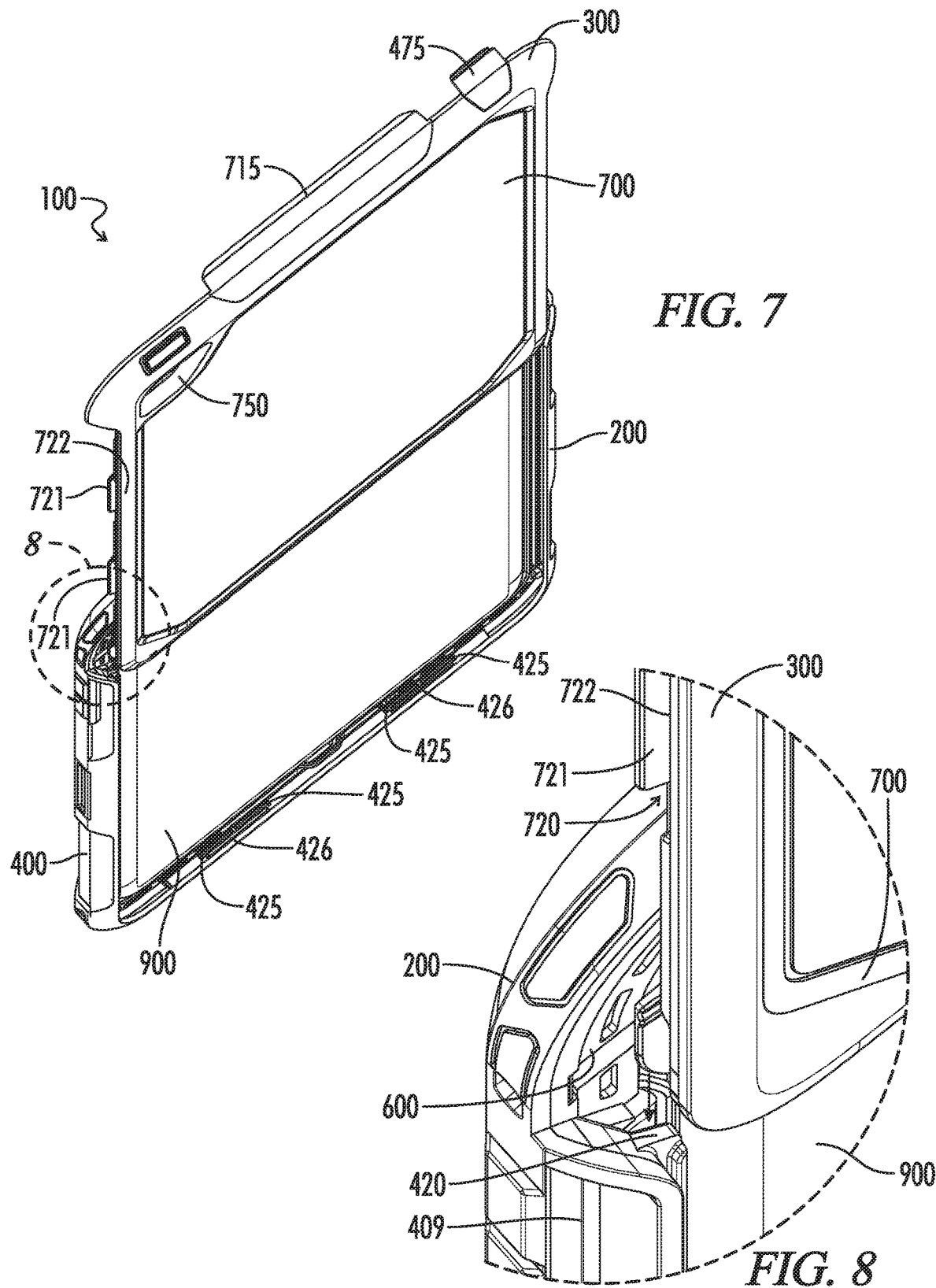

PROTECTIVE CASE FOR ELECTRONIC DEVICE

INCORPORATION BY REFERENCE TO RELATED APPLICATIONS

This application claims benefit under 35 U.S.C. § 119(e) from U.S. Provisional Application No. 62/442,424, filed on Jan. 4, 2017, which is hereby incorporated herein by reference in its entirety.

BACKGROUND OF THE INVENTION

Field of the Invention

This invention relates to accessories for electronic devices and more specifically to user removable protective enclosures or cases for mobile electronic devices.

Description of the Related Art

Mobile consumer electronic products, such as smart and cellular phones, computing tablets, MP3/audio/video players, gaming devices and laptops are continuously and rapidly evolving to meet expanding consumer demands. Many such mobile electronic devices include touchscreen displays on their front face and one or more buttons, access or charging ports, switches, sensors, speakers, and cameras. It is important to protect such devices from damage from impact, dust and moisture and yet do so while facilitating their use. While there exists protective cases to mitigate against such damage, such protective case can be difficult or inconvenient to install and uninstall from the mobile electronic device, provide insufficient protection, and fail to allow suitable interaction with the mobile electronic device or facilitate varied operation modes.

Accordingly, the inventors here have recognized that there is a continued need for protective cases that can be conveniently installed over the mobile electronic device, enhance protection while facilitate use of the mobile device in a desired manner.

BRIEF SUMMARY OF THE INVENTION

Disclosed are numerous aspects of a unique and inventive protective case configured to receive, retain and protect a mobile electronic device, such as a smart or mobile phone, a computing tablet, a laptop, an MP3 audio player, a gaming device, or other portable handheld electronic device that includes an interactive touchscreen display.

In one aspect, the protective case includes a front component and a back component that slides into one side of the front component to seal and close the case. The front component is configured to cover the front face and sides of the electronic device and includes rails or protrusions on opposing sides of its internal surface. The back component is configured to cover the back side of the electronic device and includes channels on opposing sides that are configured to slide along the rails of the front component to open and close the case.

In another aspect, the protective case is configured to be attached to a stand that facilitates multiple viewing/operating positions. The stand comprises a base that is configured to be attached to the case, a hinged stand arm, and a slide cover, that locks the stand arm into various configurations that facilitate positioning the protective case and electronic device into the multiple viewing/operating positions.

The construction, configuration and implementation of the various components of the case and stand and their interrelationship constitute additional aspects of the invention. In this regard, it should be understood that each of the foregoing and various aspects, together with those set forth in the claims and summarized above and/or otherwise disclosed herein, including the drawings, may be combined to support claims for a device, apparatus, system, method of manufacture, and/or use without limitation.

BRIEF DESCRIPTION OF THE DRAWINGS

These and other features, aspects and advantages are described below with reference to the drawings, which are intended to illustrate, but not to limit, the invention. In the drawings, like reference characters denote corresponding features consistently throughout similar embodiments.

FIG. 1A is a front left side perspective view of an exemplary implementation of an assembled protective case configured to retentively receive and protect a mobile electronic device in accordance with the teachings herein. This exemplary protective case is configured for an Apple iPad mini 4™ having a touchscreen and home button with touch ID biometric sensor on its front face.

FIG. 1B is back side plane view of the protective case illustrated in FIG. 1A.

FIGS. 7-9 are various rear perspective views of the protective case illustrated in FIG. 1A with the mobile device installed in the case and the bottom portion being slid onto the internal rails of front portion and guided by channels in the back portion. FIG. 7 illustrates the channels in the bottom portion about to be received within the rails in the front portion. FIG. 8 is a more detailed illustration of corresponding circled region in FIG. 7 depicting in more detail rail and channel configuration. FIG. 9 is a bottom portion partially installed onto the front portion of the case.

FIGS. 11A and 11B illustrates the stand in a first configuration to effectuate the typing use mode illustrated in FIG. 11A and a more upright viewing use mode illustrated in FIG. 11B. FIGS. 11C-11D are perspective and side views, respectively, illustrating the stand in a second configuration that is capable of effectuating another use mode, a more upright viewing landscape mode.

Figure 2A:
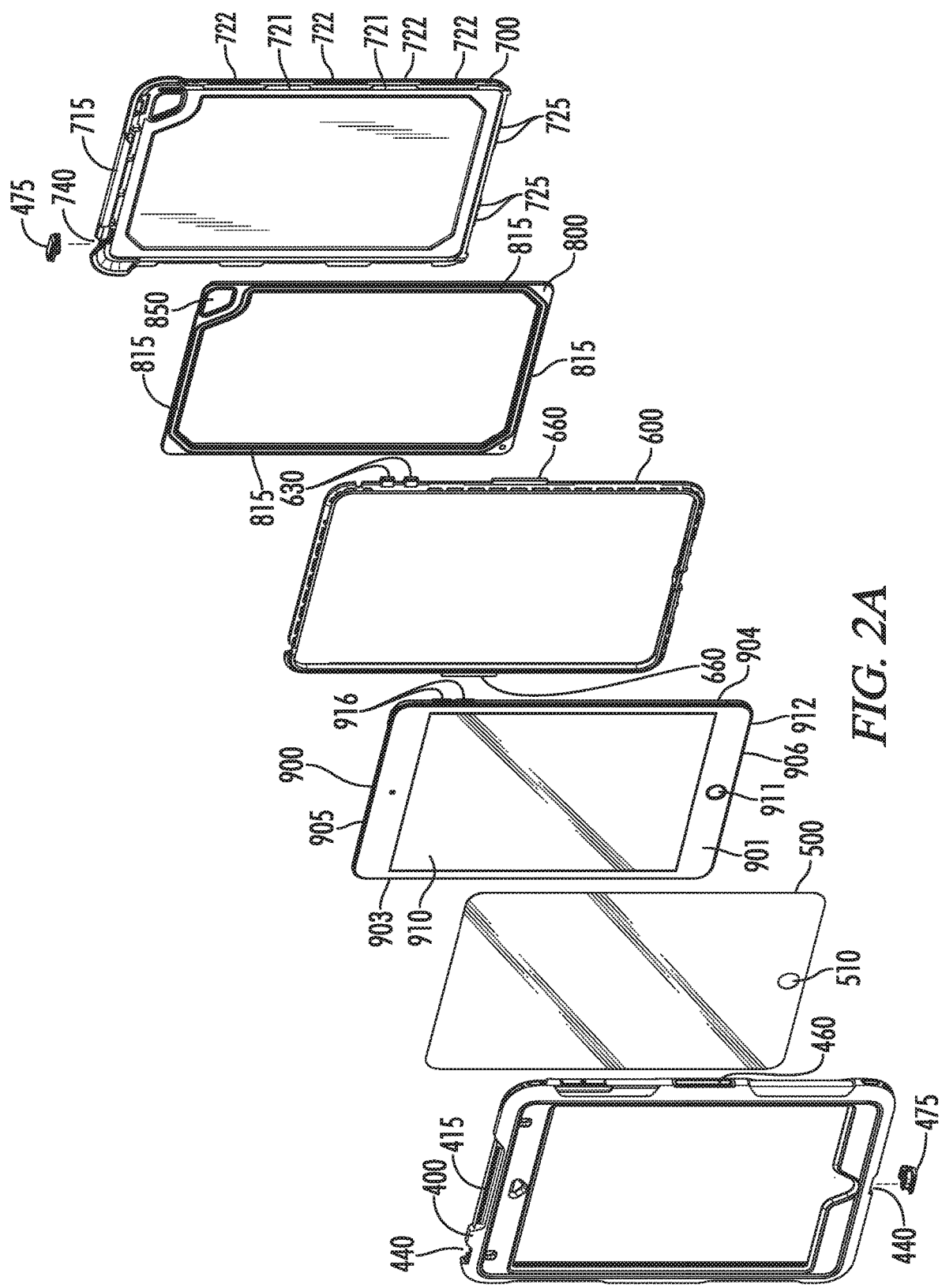
FIG. 2A is an exploded front perspective view depicting the protective case illustrated in FIG. 1A with the front shell, transparent touchscreen panel, inner bumper, back shell pad, and bottom shell components of the case being disassembled from one another.

Each drawing is generally to scale and hence relative dimensions of the various components can be determined from the drawings.

DETAILED DESCRIPTION OF THE PREFERRED EMBODIMENT

As summarized above and illustrated in the drawings, disclosed herein are various aspects of a protective case for a mobile device and reversibly detachable and configurable stand capable of providing different user viewing/operation positions. Many of those aspects are summarized above and illustrated in the drawings.

As set forth above, disclosed in FIGS. 1A-14D is a protective case 100 for a mobile or portable electronic device 900 and reversibly attachable configurable stand 1000 capable of providing enhanced protection and convenient installation and removal of the electronic device while also providing multiple use modes.

The protective case 100 includes front, back, left, right, top and bottom sides 101, 102, 103, 104, 105, 106, exterior and interior surfaces 107, 108, and an electronic device compartment 110 that is configured to receive and retain an electronic device 900. The electronic device 900 includes corresponding front, back, left, right, top and bottom sides 901, 902, 903, 904, 905, 906 with an interactive touchscreen display 910, home button/biometric sensor 911, and speaker port 912 on its front face 901, a camera lens and flash module 913 on its back face 902, a charging port 913, microphone and speaker ports 914 on its bottom side 906, and an audio jack port 915 and a plurality of buttons and/or switches (e.g., volume, on/off) 916 on its sides.

The case 100 comprises basically two major components: a front portion 200 and a back portion 300 that slides into one side of front component 200 to seal and close the case 100. The front portion 200 comprises a front shell 400, a transparent screen panel 500 and an inner bumper 600. The bottom portion 300 comprises a bottom shell 700 and a back shell pad 800. In addition, the case 100 is configured to attach to and be supported in multiple operation modes by a stand 1000. The stand generally comprises a stand base 1100, a hinged stand arm 1200 and a slide cover 1300. Each of these components are described in more detail below.

The front shell 400 comprises a perimeter support frame 410 defining a front face opening 470 configured to overlie the touchscreen display 910 and the home button and biometric sensor 911 on the front side 901 of the mobile device 900. The perimeter support frame includes C-shaped cross-section regions that are configured to overlie the front face 901 of the mobile device 900 and wrap around from the front side 101 to the back side 102 of the case 100 on three sides. In the illustrated embodiment the perimeter support frame 410 wraps has a C-shaped cross-section configuration that wraps around at the bottom, left, and right sides 106, 104, 103 of the case 100 while leaving the top side 101 with an opening to receive the back portion 300 of the case 100 that slides into that side. While in the illustrated implementation the front portion 200 is configured to allow the back portion 300 to slide into the case from the top side 101, it should be understood that the case 100 may be configured to allow the back portion 300 to slide into the case from the bottom, left or right sides.

To facilitate the sliding engagement and attachment with the back portion 300, the interior surface 411 of the front shell 400 includes rails 420 positioned on opposing left and right sides 104, 103 that extend in generally transverse direction to the open top side 105 of the front shell 400. The front shell 400 also includes slide guides 426 and retention notches 425 on the interior surface 411 at the bottom side 106 end region. The exterior surface 412 of the front shell 400 includes a clasp receiving/engaging surface 415 that is configured to be attached by the clasp 715 of the bottom shell 700 component.

The right side 103 of the front shell 400 includes button interfaces 430 that are hollowed on the inner side that are configured to reside over the volume buttons 916 of the mobile device 900. To the extent that the mobile device has a switch on one of its sides, a movable switch interface 435 may also be positioned on the perimeter of the case 100 that is configured to engage and move the switch. The top and bottom side 105, 106 of the front shell 400 can include port apertures 440 that are configured to overlie the charging and headphone jack ports 913, 915 on the electronic device 900 to facilitate charging and connecting to the headphone jack. Port plugs 475 can be provided to seal port apertures 440 when not in use. Speaker and/or microphone apertures 450, which are covered by acoustic membranes 470, may also be provided to overlie the speakers and microphones 914 of the electronic device to facilitate audio communication.

To facilitate placement and retention of the inner bumper component 600, the front shell 400 includes retention apertures 460 that are configured on the inner side to receive the inner bumper 600 retention tabs 660 and on the external side to receive the attachment protrusion 1115 on the stand base 1100 to facilitate attachment of the stand 1000 to the case 100.

The front shell 400 may be formed of any suitable material or combination of materials, including polymers and metal. In one implementation, the front shell 400 comprises multiple co-molded polymer inner and outer layers 480, 485. The inner layer 480 can be formed of a more rigid polycarbonate (PC) material, whereas the outer or external layer 485 can be formed of a relatively less rigid polymer such as thermoplastic urethane or other elastomer. The more rigid inner layer 480 generally forms a substrate upon which the softer more elastic outer layer 485 is molded. The inner layer 480 forms the outer surfaces of the front shell 400 in various regions including the internal surfaces 411 of the front shell 400 and the rails 420, and the perimeter around the front face opening 470, the clasp receiving surface 415 and the indented regions on either side of the retention apertures 460. The bulged out externally facing surfaces that surround the corners regions and overlie portions of the sides, and the button interfaces 430 are formed of the softer elastic outer layer 485 to act as a bumper and allow for the pliability necessary to be depressible by the user for use as a button.

Figure 2B:
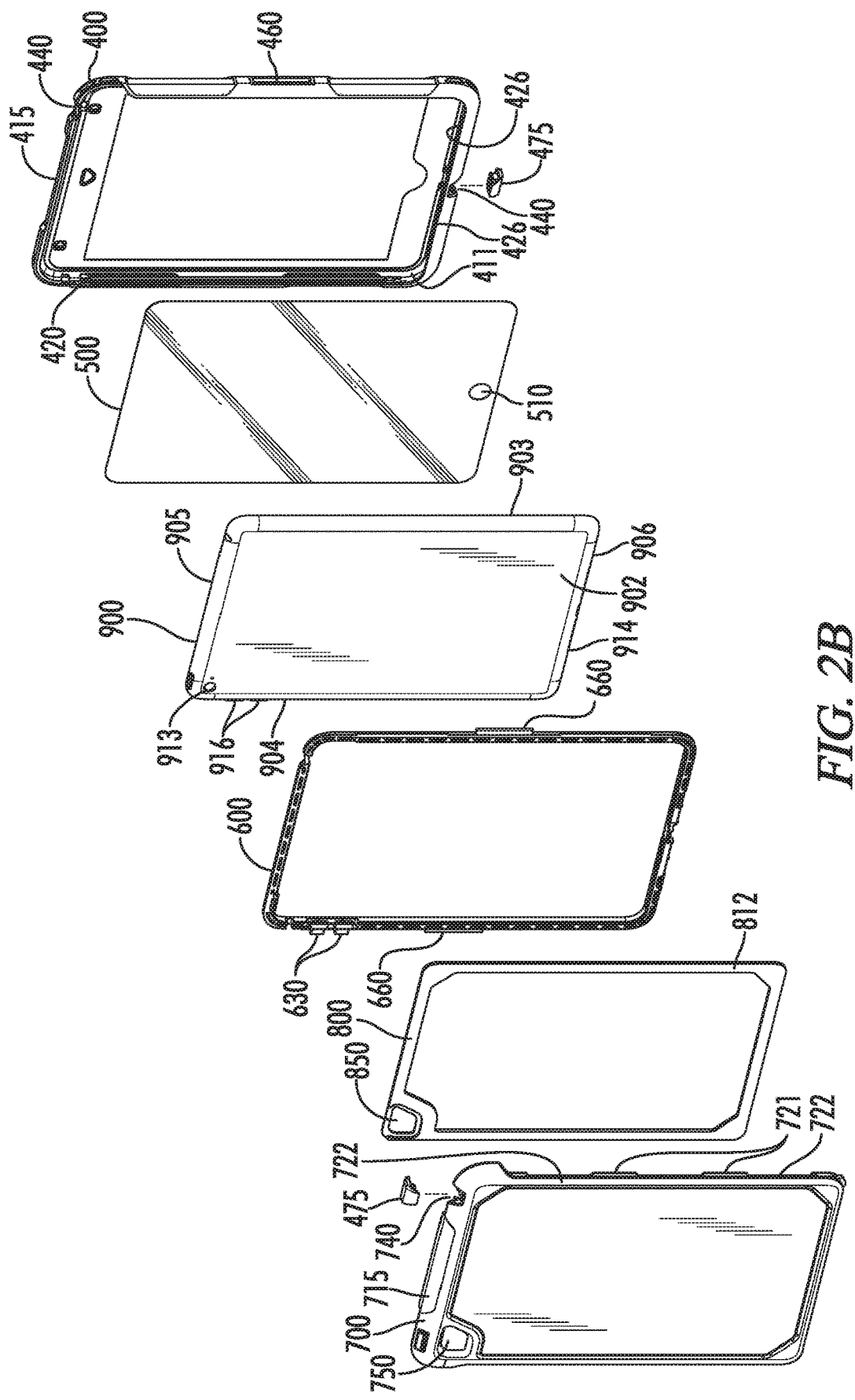
FIG. 2B is an exploded rear perspective view depicting the protective case illustrated in FIG. 1A with the front shell, transparent touchscreen panel, inner bumper, back shell pad, and bottom shell components of the case being disassembled from one another.
Figure 3A:
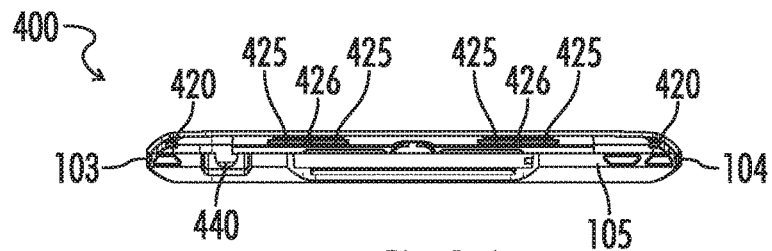
FIGS. 3A-3E are top side, left side, front side, right side, and bottom side plane views, respectively, of the front shell component of the protective case illustrated in FIG. 1A.
Figures 3B, 3C, 3D:
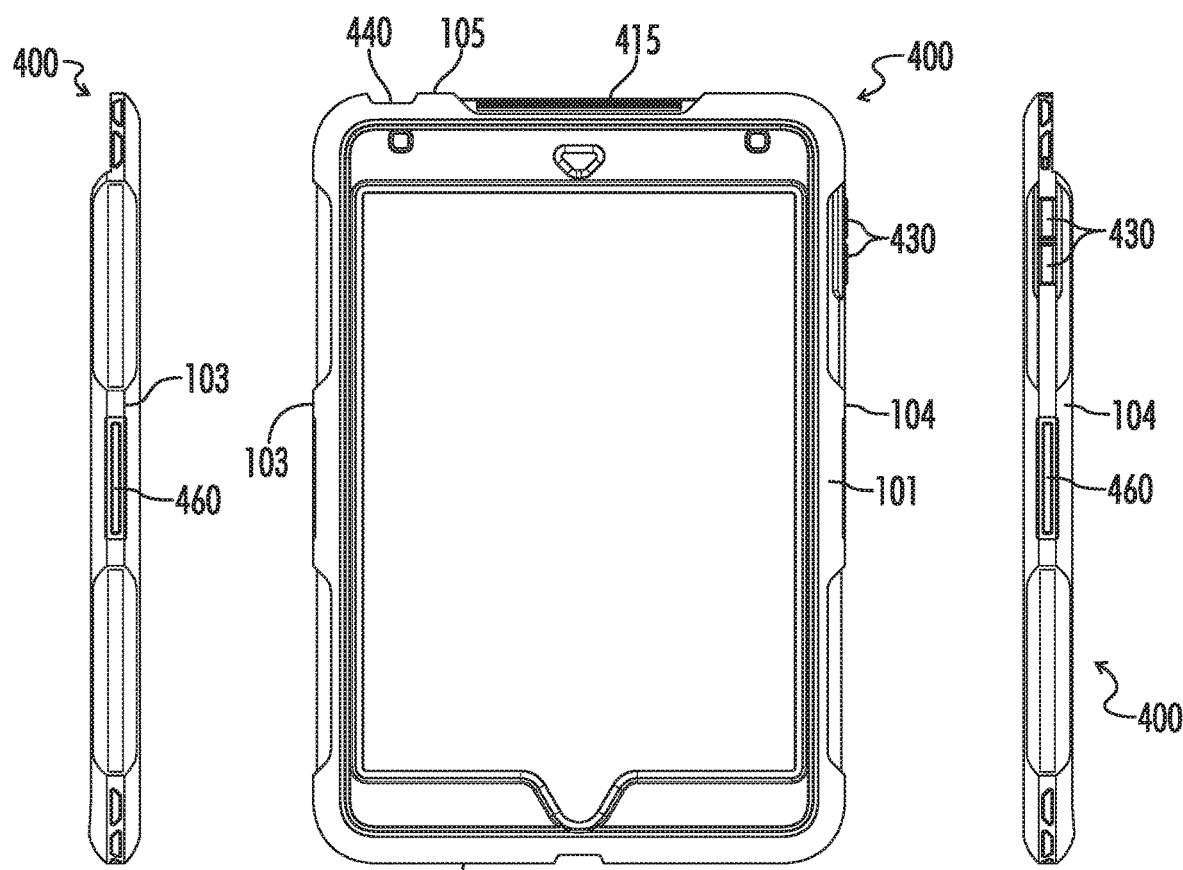
Figure 3E:
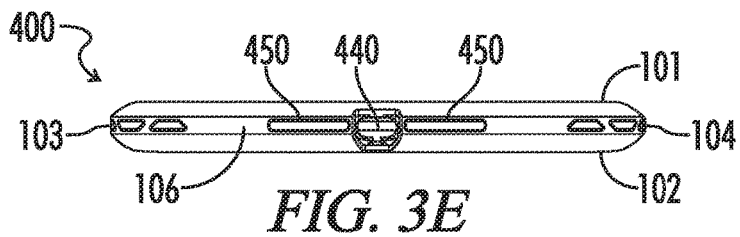
Figure 3F:
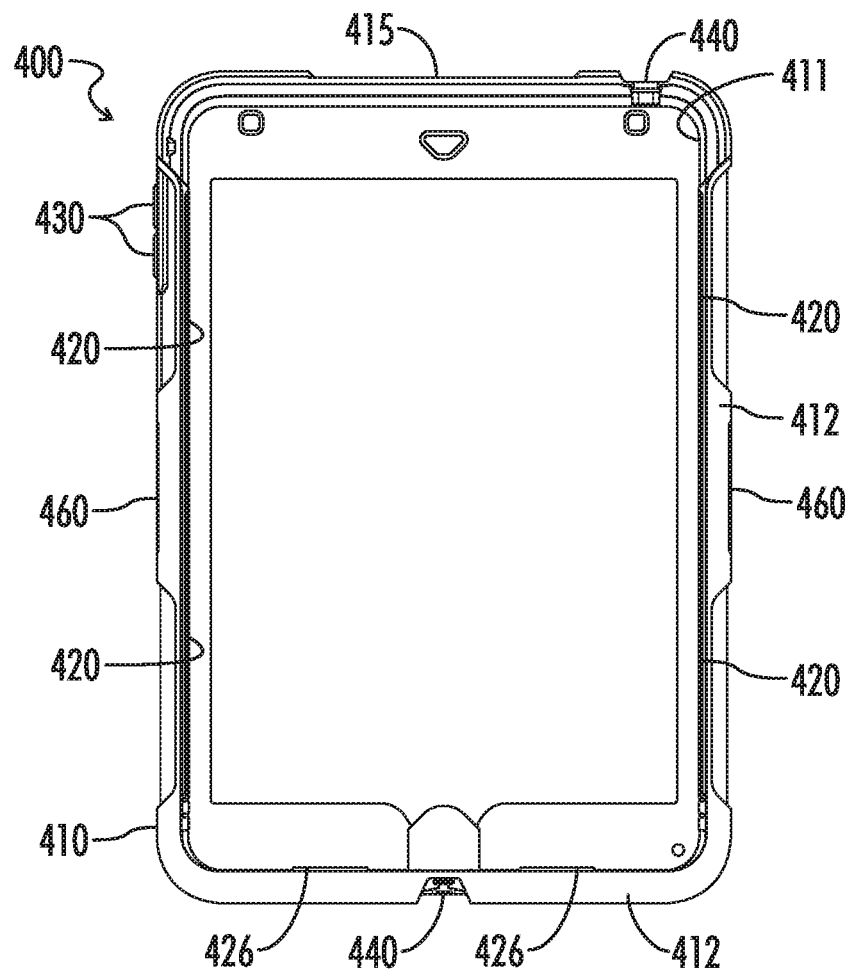
FIGS. 3F-3G are rear planar and rear perspective views, respectively, of the front shell component of the protective case illustrated in FIG. 1A.
Figure 3G:
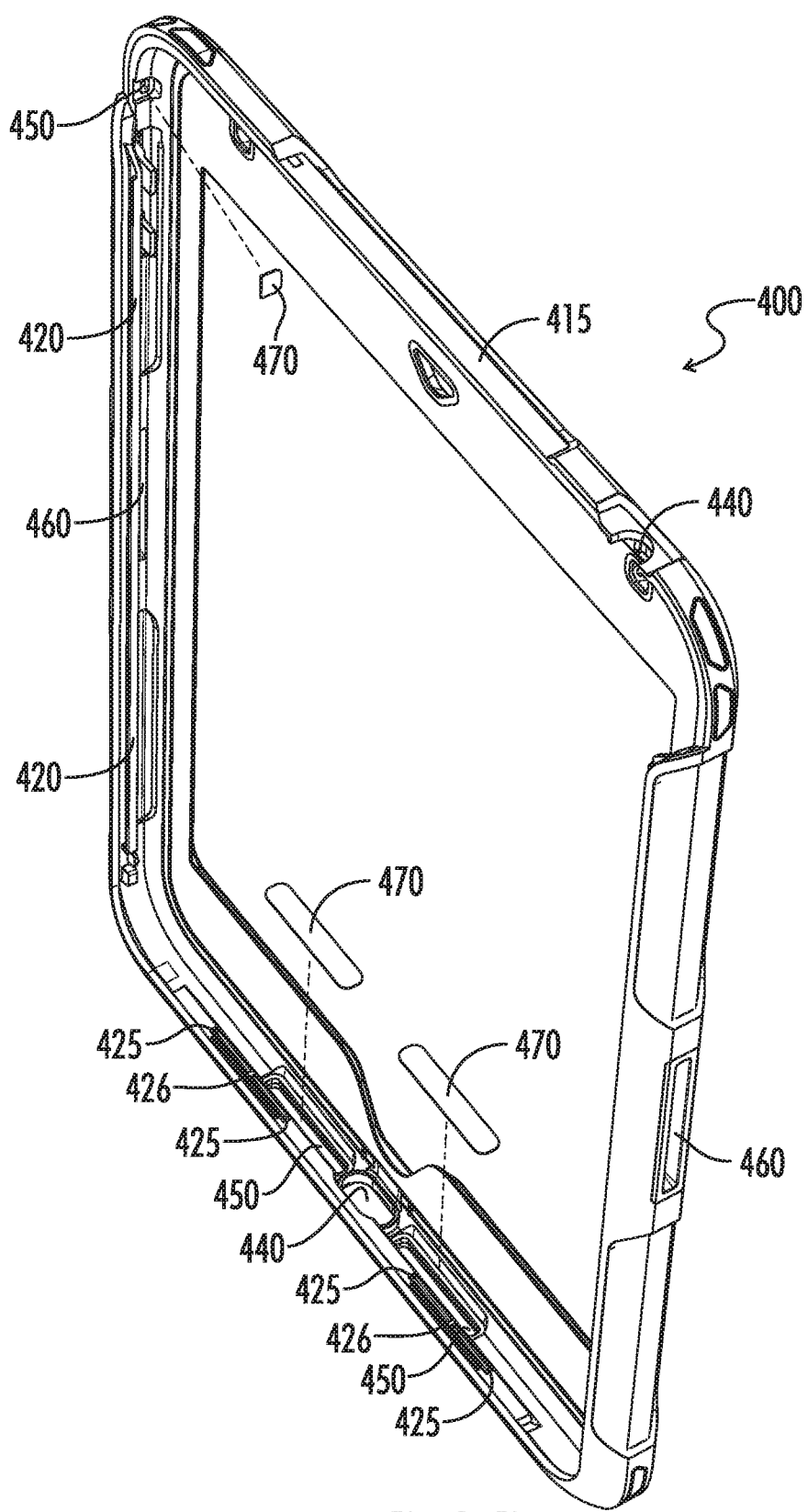
Figure 4A:
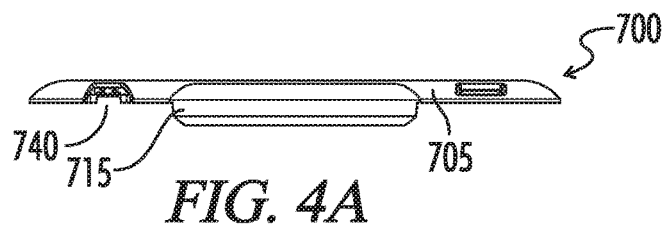
FIGS. 4A-4E are top side, right side, back side, left side, and bottom side plane views, respectively, of the bottom shell component of the protective case illustrated in FIG. 1A.
Figure 4B:
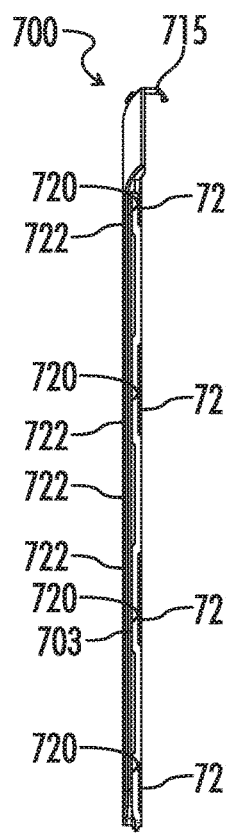
Figure 4C:
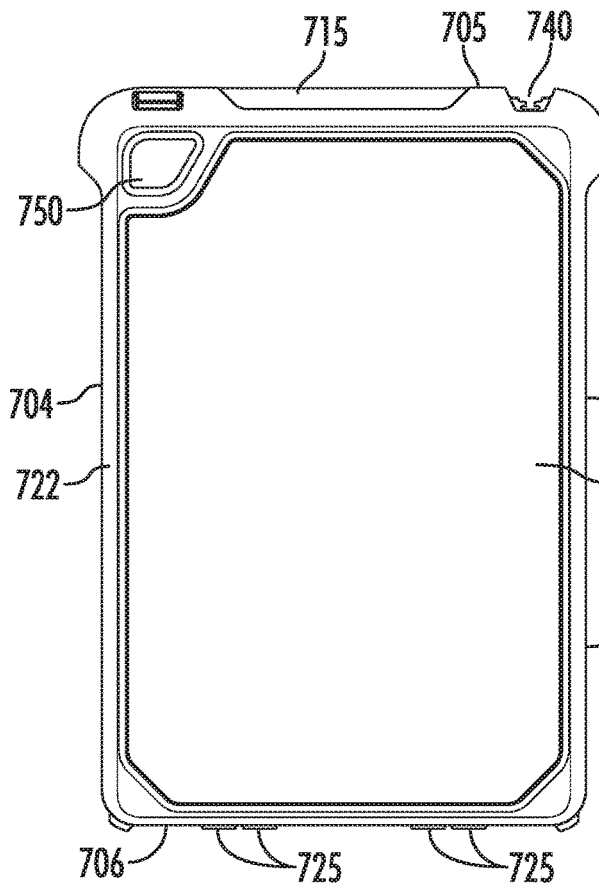
Figure 4D:
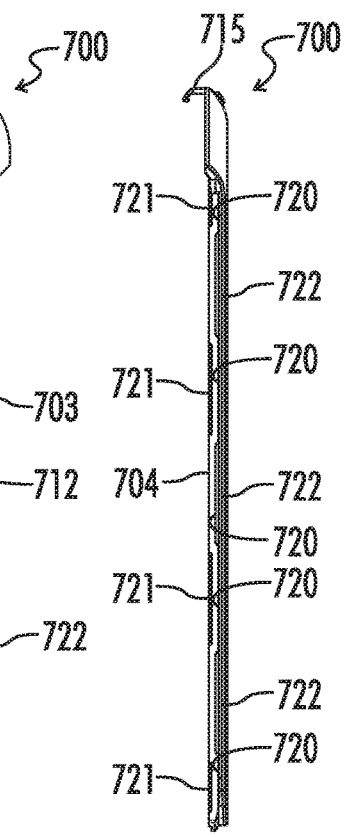
Figure 4E:
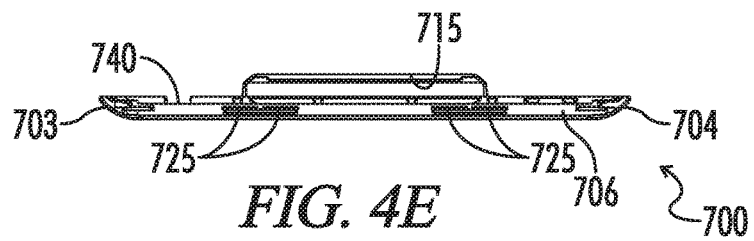
Figure 4F:
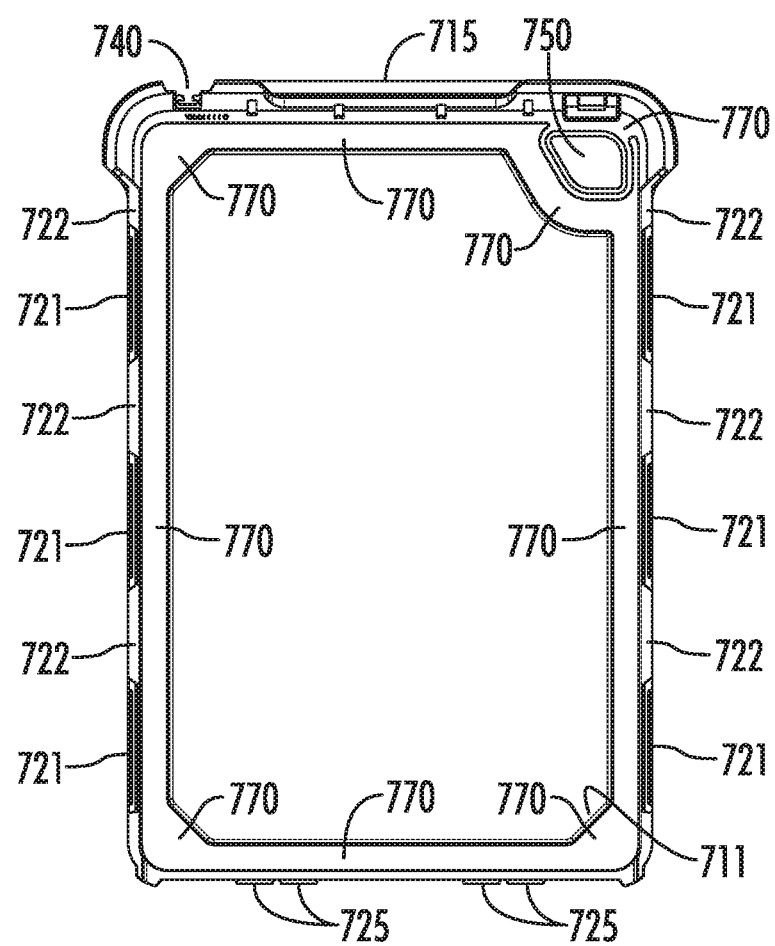
FIG. 4F is a rear planar view illustration of the bottom shell component of the protective case illustrated in FIG. 1A.
Figure 5:
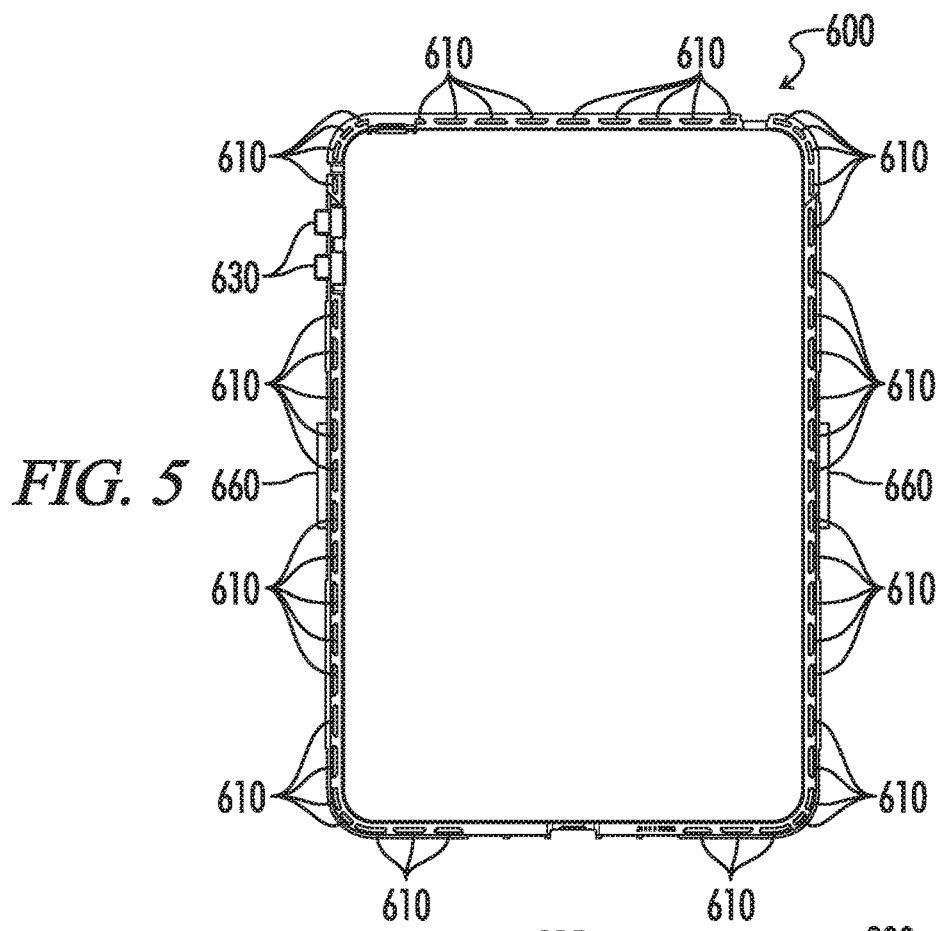
FIG. 5. is a rear planer view illustration of the inner bumper component of the protective case illustrated in FIG. 1A.

As best illustrated in FIGS. 1A and 2A-2B, mounted to the internal surface of the front shell 400 is a transparent touchscreen film or panel 500 that is configured to overlying the front face opening 470 to allow the user visibility and interaction with the touchscreen display of the electronic device. For electronic devices, like the Apple iPad that have a home button and/or biometric sensor on the front side, the transparent panel 500 may further define a user interface opening 510 that is configured to reside around and over the home button/biometric sensor 911 of the electronic device 900. To provide protected interaction with the home button/biometric sensor 911, a more flexible membrane 520 may be overlaid over the opening 510 and be attached or bonded to the transparent touchscreen panel 500 and/or front shell 400 component.

The transparent touchscreen panel 500 may be formed of any suitable material including glass, tempered or reinforced glass, or a polymer film. In one implementation, for example, the transparent touchscreen panel 500 is formed of polyethylene terephthalate (PET) film having a thickness of 0.25 mm. Similarly the more flexible membrane 520, may be formed of any suitably durable elastic polymer that allows for the needed capacitive interaction and repetitive movement associated with such home buttons/biometric sensors. In one implementation, for example, the more flexible membrane 520 is formed of a clear 2 MIL (0.002 inches) thick thermoplastic polyurethane (TPU) film.

The inner bumper component 600, as best illustrated in FIGS. 2A-2B, 5 and 8, is configured as a unitary component and is configured to be positioned and reside within the perimeter internal surface 411 of front shell 400 and be configured externally to conform to the surface configuration of the underlying internal surface areas of the front shell 400. The inner bumper 600 is further configured to include button interfaces 630 that are configured to reside within the hollow cavities in button interfaces 430 of the front shell 400 and engage with the buttons 916 on the mobile device 900 in response to the user depressing the button interfaces 430 on the front shell 400. The inner bumper 600 is also configured to include retention tabs 660 that are configured to reside within the retention apertures/notches 460 formed on the interior surface 411 on the bottom end section of the front shell 400.

The inner bumper 600 may be formed of any suitable elastomeric material or other materials capable of effectuating the desired cushioning. In one implementation, the inner bumper is formed as a unitary molded frame structure formed of silicone having a Shore A hardness of 50+/−5 to provide the desired firmness and cushioning. As best illustrated in FIGS. 2A-2B, 5 and 8A, plurality of apertures or cavities 610 may be provided through the inner bumper 600 frame structure to provide additional flexibility and cushioning.

Bottom shell component 700 of the back portion 300, which is best illustrated in FIGS. 1B, 2A-2B, 4A-5 and 7-11D, generally comprises a back panel 710 having corresponding inner and outer faces 711, 712 and left, right, top and bottom sides 703, 704, 705, 706. The left and right sides include opposing channels 720 on their inner face 711 that are configured to track or slide over the rails 420 of the front portion 200 when the bottom portion 300 is attached to the top portion 200. The channels 720, which are best illustrated in the left and right side views of FIGS. 4B-4D and the detailed illustration in FIG. 8, are defined in the inner face 711 between the inner surface of the exterior wall 722 on one side and a series of protruding wall structures 721 extending from the inner face 711 on the other side.

The top side 705 of the bottom shell 700 can further include a clasping member 715 that is configured to attach to or clasp receiving surface 415 on the front shell 400 when the bottom portion 300 is attached to the front portion 200 and thereby serves to keep the case 100 closed. The bottom shell 700 can further include retention protrusions 725 on its bottom side 706 that are configured to being received within corresponding retention notches 425 on the bottom end inner surface 411 of the front shell 400.

Like the front shell 400, various apertures can be provided in the bottom shell 700 to facilitate interaction and operative of the electronic device 900. For example, an audio jack aperture 740 is provided on the top side 705 of the bottom shell 700 and corresponds to the audio jack aperture 440 in the front shell 400 and the audio jack port 915 of the electronic device 900. A camera/flash module aperture 750 is further provided near the top right corner to correspond with the position camera lens and flash module 913 on the back face 902 of the electronic device 900. The inner surface 711 of the bottom shell 700 further includes a perimeter cavity 770 that is configured to receive and retain in position the back shell pad 800.

Figure 6:
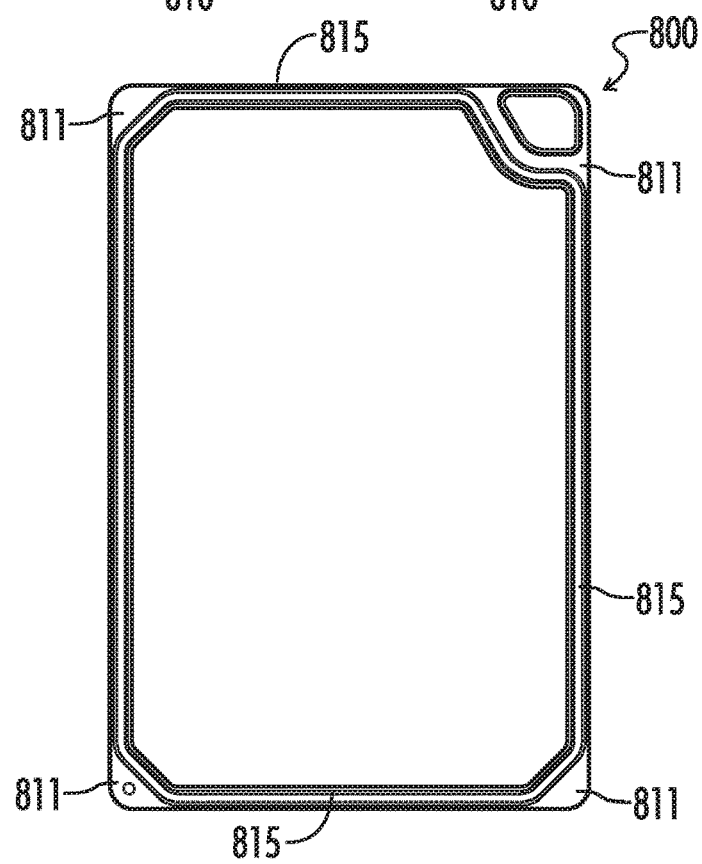
FIG. 6 is a rear planer view illustration of the back shell pad component of the protective case illustrated in FIG. 1A.

The back shell pad 800, as best illustrated in FIGS. 2A-2B and 6, comprises front and back surfaces 811 and 812, and as noted is configured to being received in, the perimeter cavity 770 on the inner surface 711 of the bottom shell 700. The front surface 811 includes an elevated contour surface 815 to provide for additional cushioning while the back face 812 is generally flat to correspond to the surface of the perimeter cavity 770 of the bottom shell 700. The back shell pad 800 may be formed of any suitable elastomeric material or other materials capable of effectuating the desired cushioning or impact dissipation. In one implementation, the back shell pad 800, like the inner bumper component 600, may be formed as a unitary molded frame structure formed of silicone having a Shore A hardness of 50+/−5, which has been found to provide suitable firmness and cushioning. The back shell pad 800 may be bonded by any suitable means (e.g., adhesive, chemically) to the bottom shell 700 or may be co-molded thereto.

Figure 9:
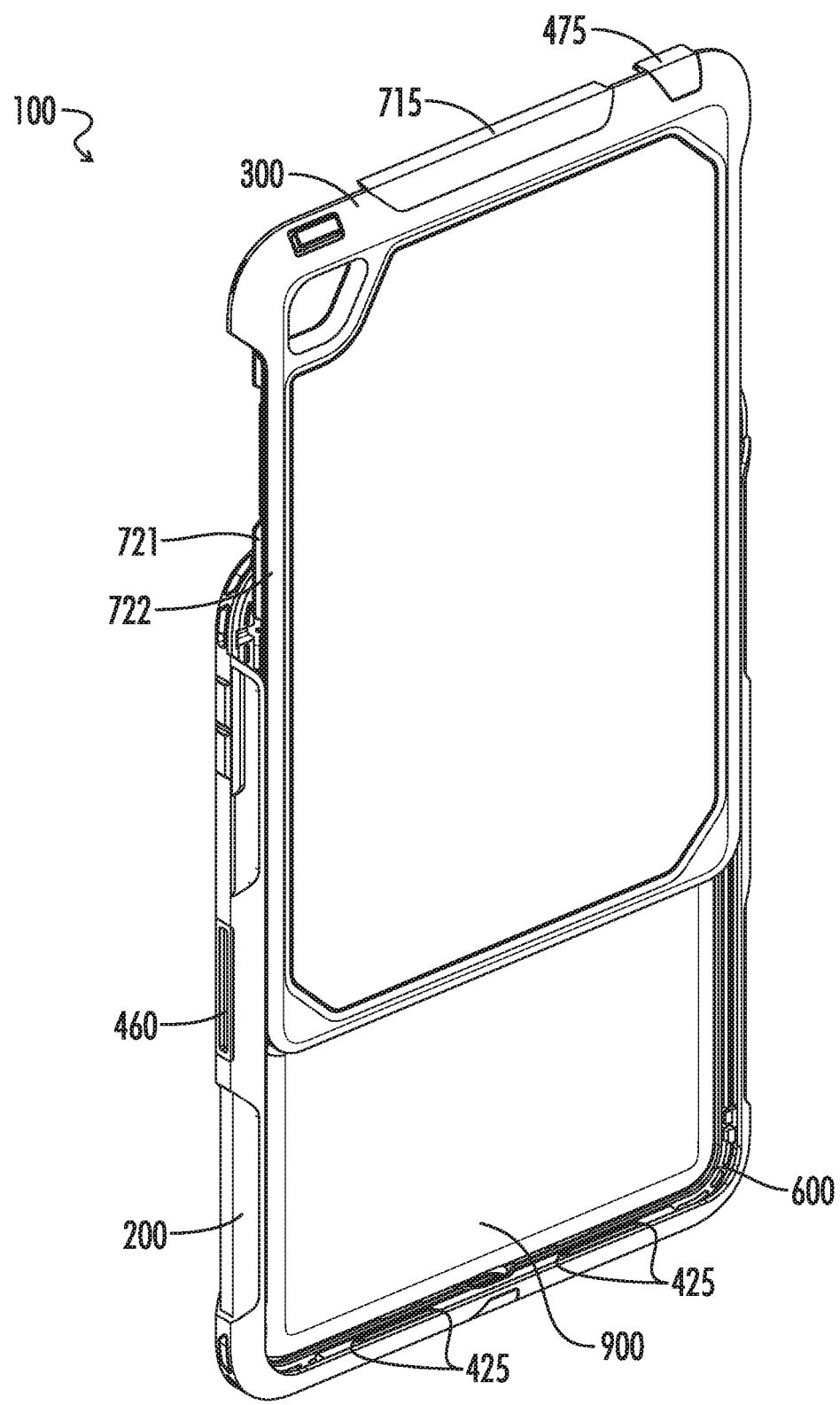

FIGS. 7-9 are a series of illustrations depicting how the back portion 300 is attached to the front portion 200 by position and then sliding the bottom side 706 of the back portion 300 into the open-ended top side of the front portion 200 so that the opposing channels 720 on the bottom shell 700 are received and guided into the closed position by the corresponding rails 420 in the interior surface 411 of the side walls of the front shell 400. In operation, the user opens the case 100 by sliding the back portion 300 off the front portion 200, then inserts the electronic device 900 front face down onto the inner bumper 600 of the front portion 200. Once the electronic device 900 is properly position in the front portion 200, the back portion 300 can be slid into the front portion as previously described until the case 100 is closed.

The retention apertures 460 provide a means for attaching accessory components to the case 100. One such accessory component is a configurable stand 1000, which is best depicted in FIGS. 10A-14. The stand 1000 generally comprises a stand base 1100, a hinged stand arm 1200, and a slide cover 1300. The stand base 1100 is generally in a form of a panel having a length, width, and thickness and being configured to extends longitudinally from a first end region 1101 to a second end region 1102 and includes an inner case facing surface 1103, an opposing outer facing surface 1104, with the thickness being defined between those opposing faces 1103, 1104. Each of the end regions 1101, 1102 includes a curved C shaped clasp arm 1110 that includes an attachment protrusion 1115, extending from its inner facing surface 1103, and configured to be externally received in retention apertures 460.

The outer facing surface 1104 of the stand base 1100 includes a plurality of steps or ledges 1120 formed therein, each of which is configured to include a plurality of apertures or notches 1130 that are configured to receive feet 1230 protruding from the free-end of the hinged stand arm 1200 as further described below. A plurality of retention cavities 1150 are positioned on the outer surface 1104 of the stand base 1100 and are configured to retentively receive protrusions 1250 correspondingly positioned on the internal surface 1203 of the hinged stand arm 1200 when the two components are pressed against one another so that the outer surface 1104 of the stand base 1100 is in contact with the inner facing surface 1203 of the hinged stand arm 1200. The width of the stand base 1100 includes recessed regions 1160 on other sides are configured to confine the slider 1300 therein when the hinged arm 1200 is in the closed position.

The hinged stand arm 1200, as best illustrated in FIGS. 10A-11D and 13A-13B, is also generally in the form of a panel having a length, width, and thickness and being configured to extends longitudinally from a first end region 1201 to a second end region 1202 and includes an inner case facing surface 1203, an opposing outer facing surface 1124, with the thickness being defined between those opposing faces 1203, 1204. The first end region 1201 of the stand arm 1200 is hinged via a first hinge 1210 to the first end region 1101 of the stand base 100. The stand arm 1200 further includes a second internal hinge 1220 that allows the stand arm to flex over itself as best illustrated in FIGS. 11A-11B and delineates a first section 1205 of the stand arm 1200 from the second section 1206 of the stand arm 1200 with the first section 1205 residing between the first and second hinges 1210, 1220 and the second section 1206 residing between the second hinge 1120 and the second end region 1202. The feet 1230 are positioned at the second end 1202, which is the free end of the stand arm, and as stated above are configured to fit in the notches 1130 when the stand arm is position on a ledge 1120.

Figure 10A:
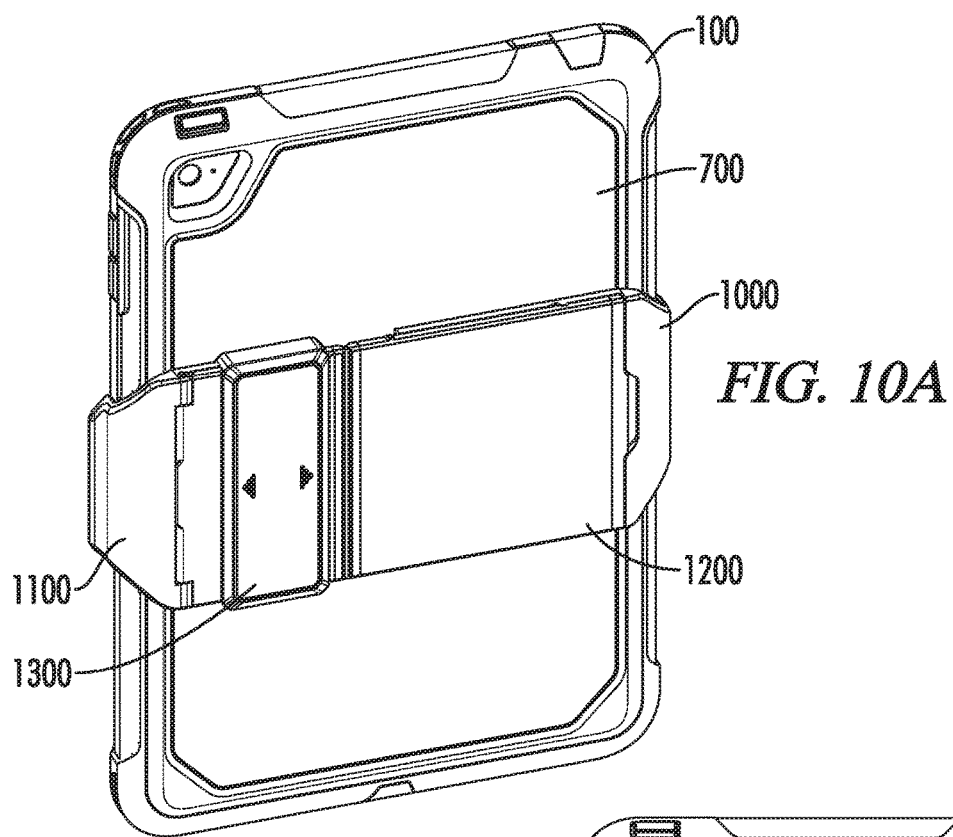
FIGS. 10A and 10B are rear perspective and rear planar views, respectively, of the case illustrated in FIG. 1A with a configurable stand attached to the left and right sides of case. The stand is in the fully closed position.
Figure 10B:
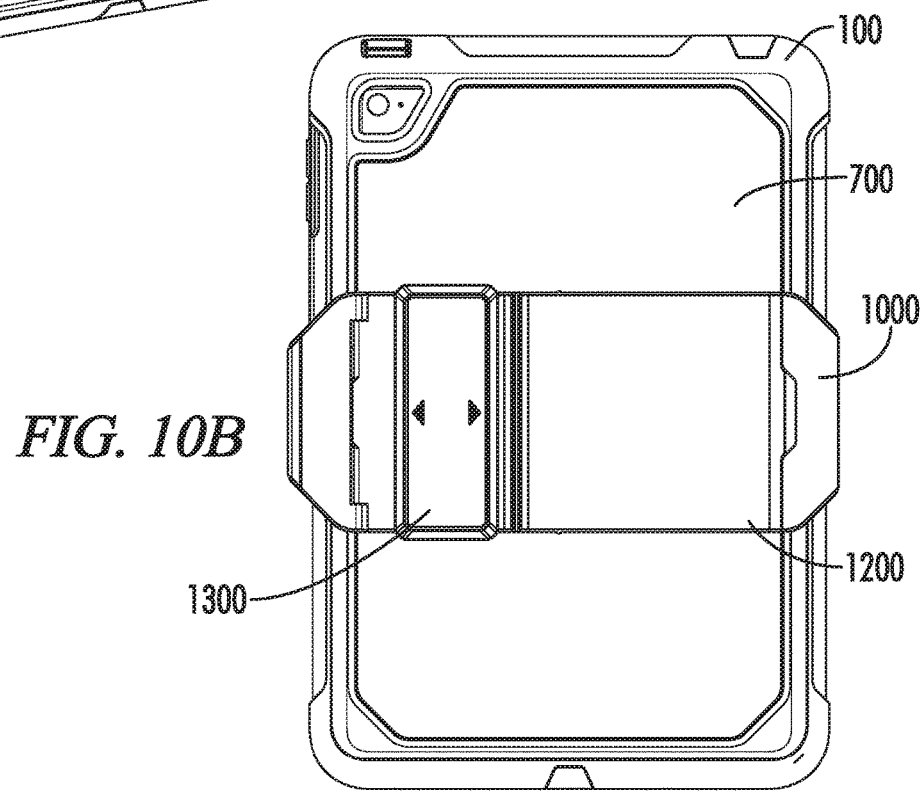

An additional flex joint 1232 may be included in the second section 1206 to add further flexibility in the stand arm 1200 to facilitate manipulation of the feet 1230 in and out of the notches 1130. The stand arm 1200 further includes slide cover retention protrusions or bumps 1240 on opposing edges of both the first and second sections 1205, 1206 on either side of the second hinge 1220 to facilitate friction fit interaction with ribs 1330, positioned on the internal corner regions of the inner case facing surface 1302 of the slide cover 1300, that allow the slide cover to be locked into two different positions on the stand arm 1200. Similarly, two sets of protrusions 1250 are configured to extend from the inner surface 1203 of the stand arm 1200, with a first set positioned on the first section 1205 and a second set positioned on the second section 1206 so that they reside on either side of the second hinge 1220. The protrusions 1250 are positioned to be restively received within the retention cavities 1150 correspondingly positioned on the outer surface 1104 of the stand base 1100 and thereby may further assist in keeping the stand arm 1200 in the closed position as illustrated in FIGS. 10A-10B.

The hinged stand arm 1200 may be formed of any suitable materials to effectuate the needed rigidity and flexibility at the hinge 1220. In one implementation, the hinged stand arm 1200 is formed of molded polymer materials with sections 1205 and 1206 being formed of a rigid polymer such as PC and internal hinge 1220 and the feet 1230 being co-molded thereto and formed of a softer polymer material such as TPU or an elastomer. The hinge 1220 in this configuration is thus a living hinge configuration, whereas the hinge 1210, between the stand arm 1200 and the stand base 1100, is more of a conventional mechanical hinge that is formed pins that extends outwardly from the first end section 1201 of the stand arm 1200 and that are received within correspondingly dimensioned cavities or channels in the first end region 1101, below the clasp arm 1110, of the stand base 1100.

Figure 11A:
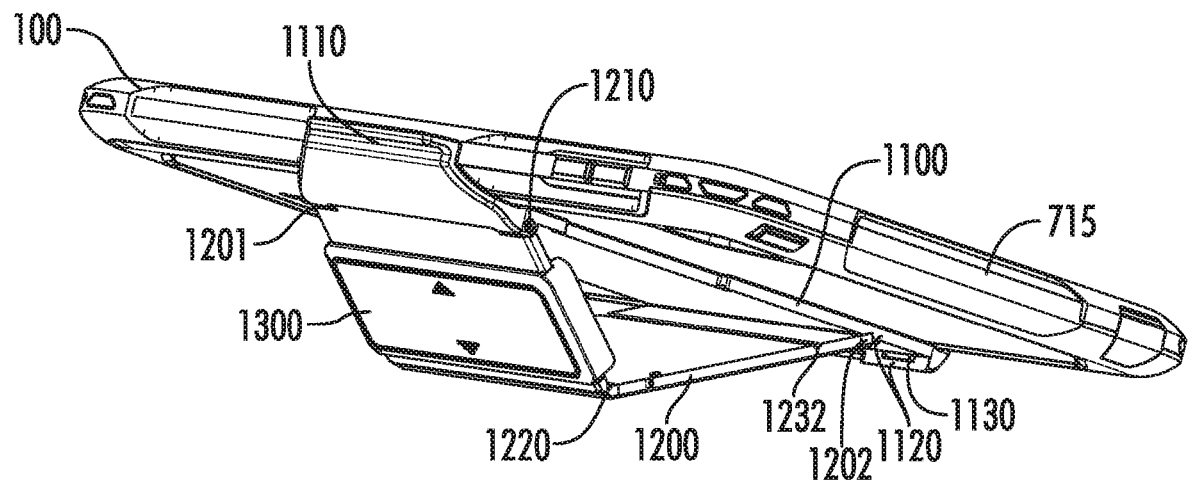
FIGS. 11A-11D are various perspective and side views of the case illustrated in FIG. 1A with a configurable stand attached to the left and right sides of case and configured in different use modes.
Figure 11B:
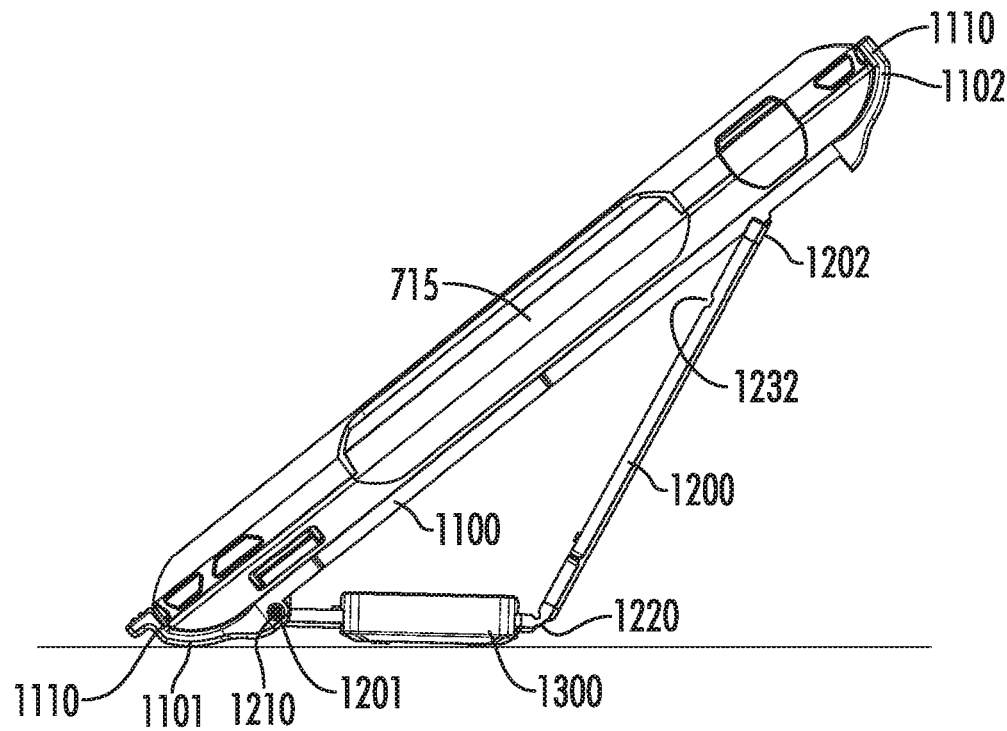
Figure 11C:
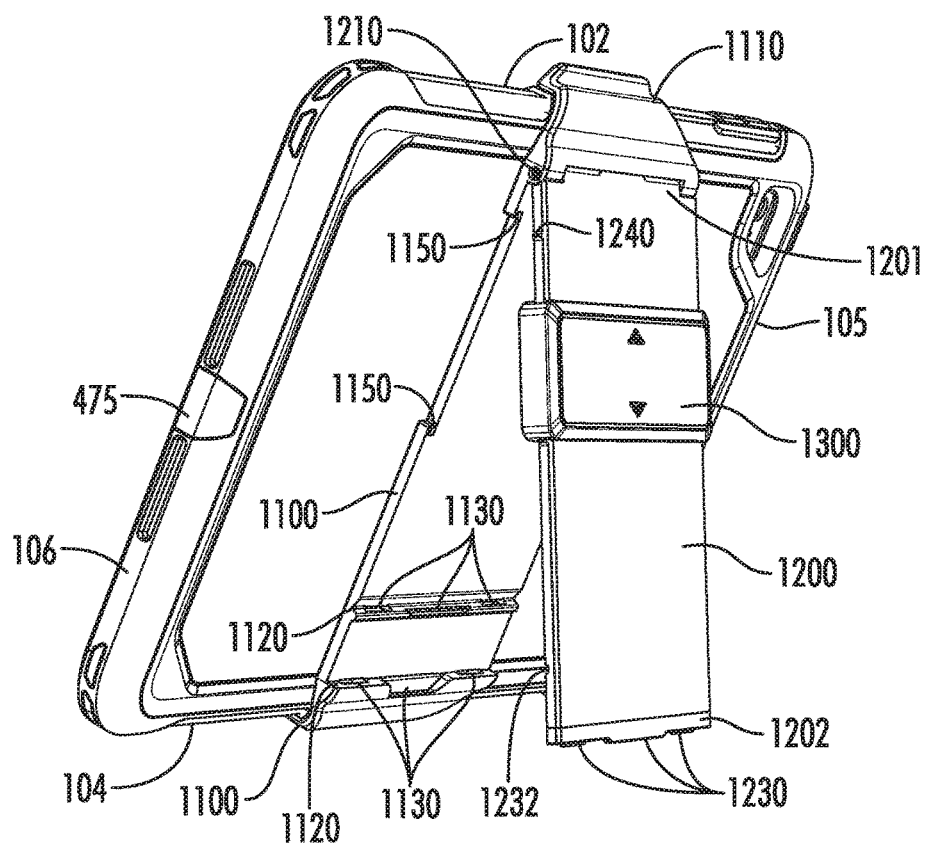
Figure 11D:
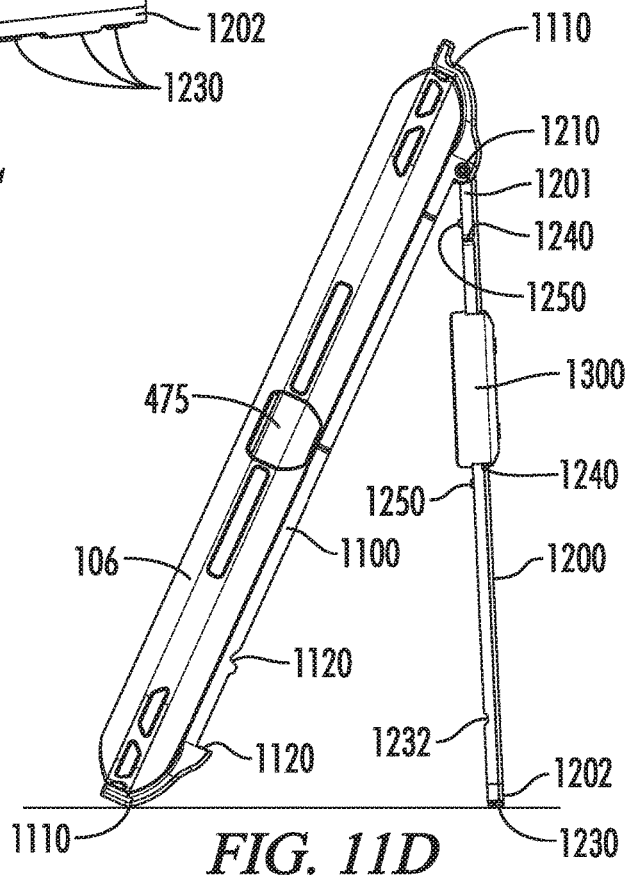
Figure 12A:
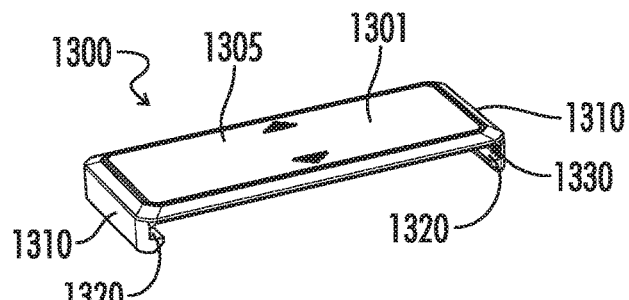
FIGS. 12A and 12B illustrate perspective views of the outside and inside surfaces, respectively, of the sliding cover component of the stand illustrated in FIGS. 10A-11D.
Figure 12B:
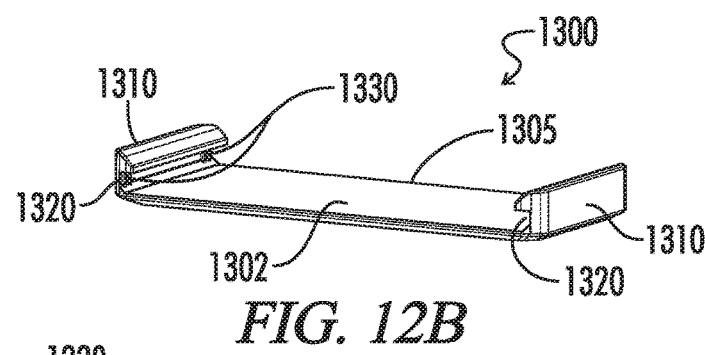
Figure 13A:
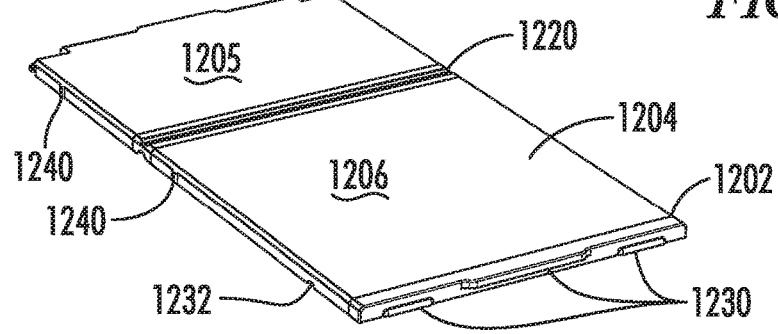
FIGS. 13A and 13B illustrate perspective views of the inside and outside surfaces, respectively, of the hinged stand arm component of the stand illustrated in FIGS. 10A-11D.
Figure 13B:
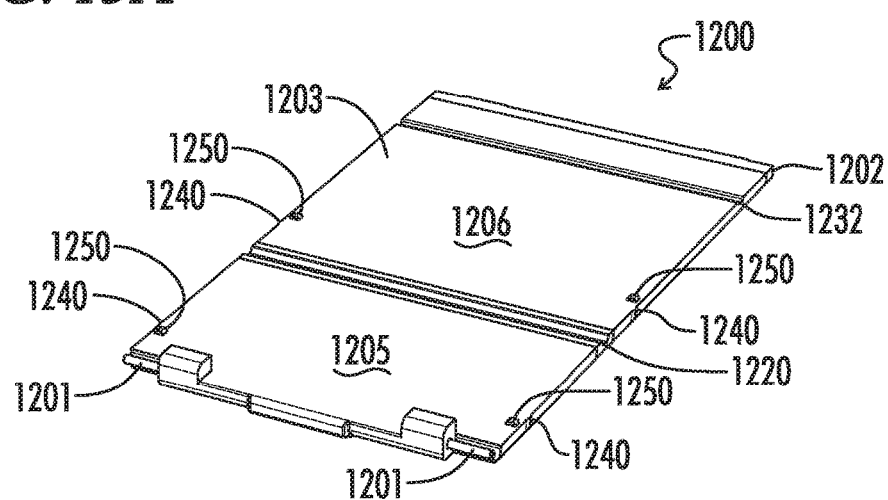
Figure 14A:
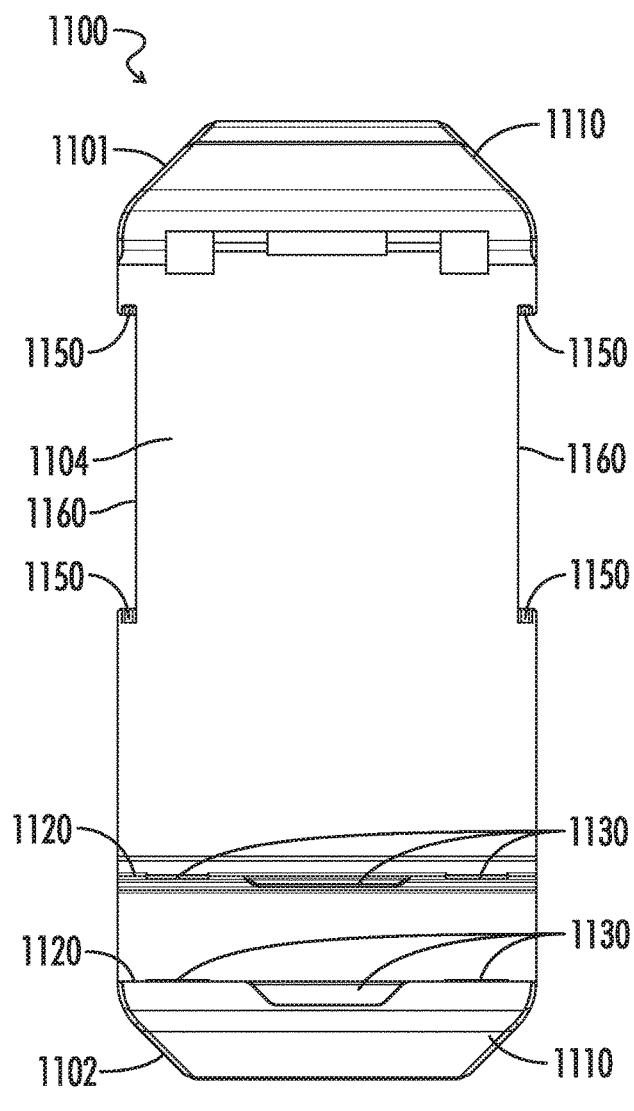
FIGS. 14A and 14B illustrate planar views of the outside and inside surfaces, respectively, of the stand base component of the stand illustrated in FIGS. 10A-11D.
Figure 14B:
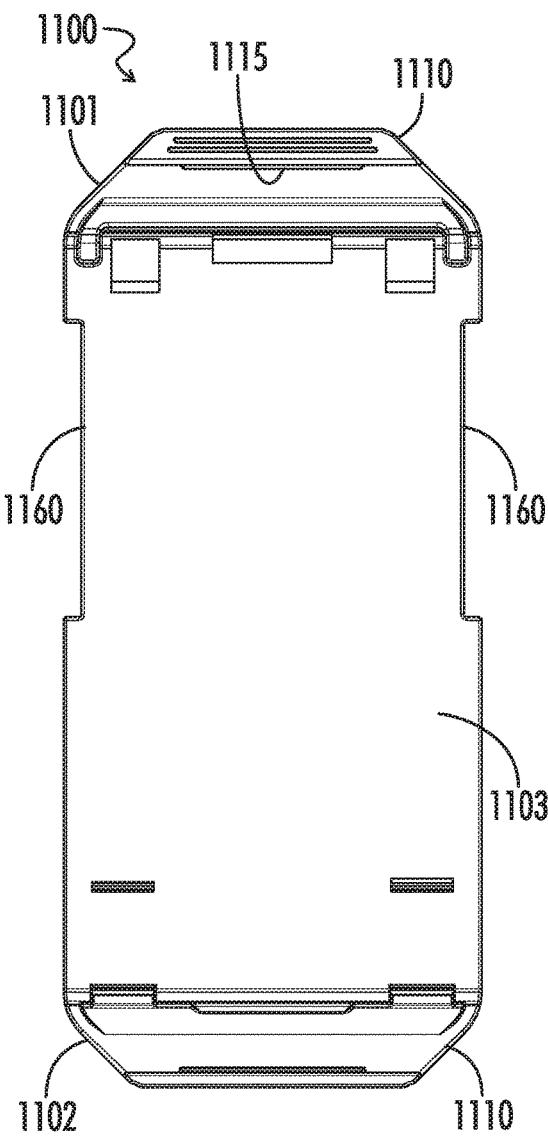
Figure 14C:
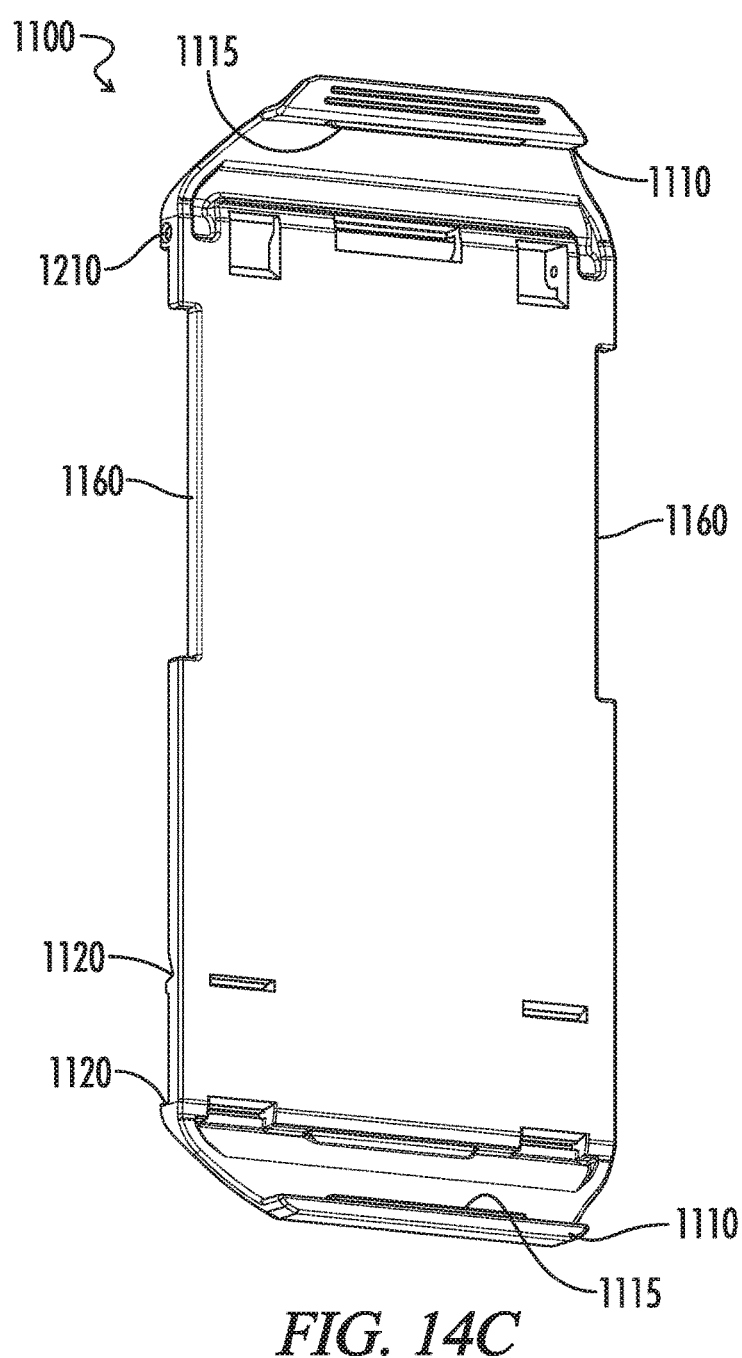
FIGS. 14C and 14D illustrate perspective and side views, respectively, of the stand base component of the stand illustrated in FIGS. 10A-11D.
Figure 14D:
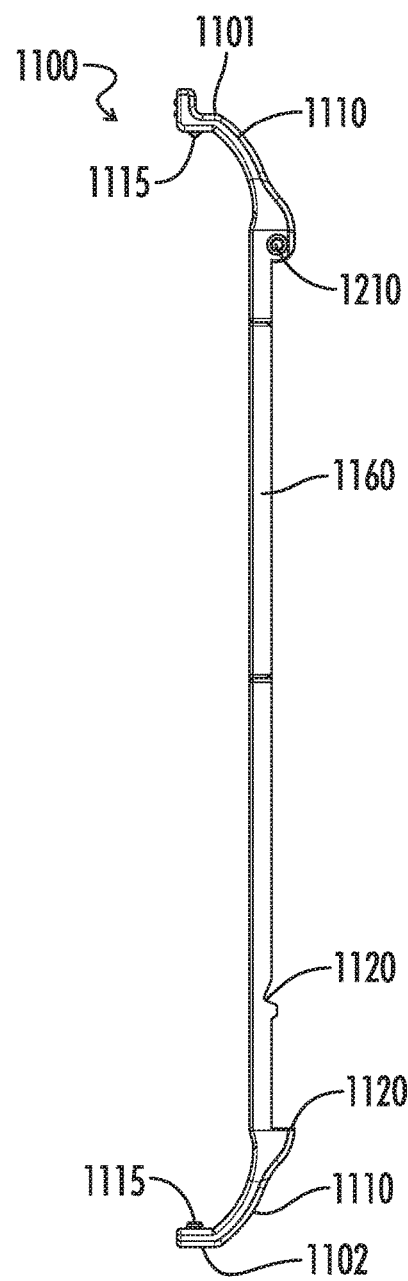

The slide cover 1300 component and its operation is best illustrated in FIGS. 10A-10B, 11A-11D and 12A-12B. The slide cover 1300 is generally comprised of an inner case facing surface 1302 and outer externally facing surface 1301 and includes a middle panel 1305 with transversely extending side walls 1310 on opposing ends. The inner facing surfaces 1302 of the side walls 1310 are configured to include channels 1320 that are dimensioned to receive and slide along the sides of the hinged stand arm 1200 from a first locked position where the slide cover 1300 overlies the hinge 1220 to a second unlocked position where the slide cover 1300 is adjacent to the hinge 1220. In the second unlocked position, which is depicted in FIGS. 10A-10B and 11A-11B, the slide cover 1300 does not restrict the hinge 1220 from bending. Whereas in the first locked position, which is depicted in FIGS. 11C-11D, the slide cover 1300 overlies the hinge 1220 and resides over both the first and second sections 1205 and 1206 and thereby precludes or mitigates against bending of the stand arm 1200 along its internal hinge 1220. The inner facing surfaces 1302 of the side walls 1310 further include catches or ribs 1330 that are configured to retentively attach to the protrusions or bumps 1240 on opposing edges of the first and second sections 1205, 1206 of the stand arm 1200 and thereby fix the slider cover 1300 in the locked or unlocked position.

The slide cover 1300 may be formed of any suitable material including metal or polymer. In one implementation, the slide cover 1300 is formed of a molded rigid polymer such as PC.

While a stand accessory is described it should be understood that various other case accessories or modules may be attached to the stand via the retention apertures 460. Such modules may provide additional functionalities.

Further, while the protective case described herein is disclosed in the context of a tablet computing device, it should be understood that the structural components and features may be adapted to other electronic devices including smart and cellular phones, laptops, MP3/audio/video players, and gaming devices. Moreover, although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should therefore be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of claims made in this patent document and any future patent document that relies on this disclosure.

Similarly, this method of disclosure, is not to be interpreted as reflecting an intention that any claim require more features than are expressly recited in that claim. Rather, as the following claims represent, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A configurable stand module that facilitates multiple viewing/operating positions comprising:
    a base having an outer facing surface and configured to be attached to a protective case;
    a stand arm that extends from a fixed end to a free end, wherein the fixed end is hingedly connected to the base at a first hinge, and wherein a second hinge is positioned between the fixed end and the free end; and
    a slide cover configured to move over the stand arm and the second hinge and lock the stand arm to preclude or mitigate against bending of the stand arm along the second hinge, wherein the stand arm is configurable at its hinges into multiple viewing/operating positions;
    wherein the outer facing surface of the base includes a plurality of steps or ledges formed therein, wherein each of the plurality of steps or ledges is configured to include a plurality of apertures or notches configured to receive feet protruding from the free end of the stand arm,
    wherein the second hinge allows the stand arm to flex over itself and delineates a first section of the stand arm from a second section of the stand arm with the first section residing between the first hinge and the second hinge, and the second section residing between the second hinge and the free end,
    wherein the slide cover comprises an inner case facing surface and an outer externally facing surface and includes a middle panel with transversely extending side walls on opposing ends, and
    wherein each of the side walls has an inner facing surface and is configured to include channels dimensioned to receive and slide along the sides of the hinged stand arm from a locked position where the slide cover overlies the second hinge to an unlocked position where the slide cover is adjacent to the second hinge and the slide cover does not restrict the second hinge from bending.

2. The configurable stand module of claim 1, wherein a plurality of retention cavities are positioned on the outer facing surface of the stand base and are configured to retentively receive one or more protrusions correspondingly positioned on an inner facing surface of the hinged stand arm.

3. The configurable stand module of claim 2, wherein a width of the stand base includes one or more recessed regions and is configured to confine the slide cover therein when the stand arm is in a closed position.

4. The configurable stand module of claim 1, wherein the feet are positioned at the free end and are configured to fit in the plurality of steps or ledges when the stand arm is positioned on one of the plurality of ledges.

5. The configurable stand module of claim 1, wherein an additional flex joint is included in the second section to add further flexibility in the stand arm to facilitate manipulation of the feet in and out of the plurality of apertures or notches.

6. The configurable stand module of claim 1, wherein the stand arm further includes one or more slide cover retention protrusions or bumps on opposing edges of both the first section and the second section on either side of the second hinge.

7. The configurable stand module of claim 6, wherein the one or more slide cover retention protrusions or bumps are configured to facilitate friction fit interaction with one or more ribs positioned on an internal corner region of an inner facing surface of the slide cover allowing the slide cover to be locked into at least two different positions on the stand arm.

8. The configurable stand module of claim 1, wherein in the locked position the slide cover overlies the second hinge and resides over both the first section and the second section and thereby precludes or mitigates against bending of the stand arm along the second hinge.

9. The configurable stand module of claim 1, wherein the inner facing surfaces of the side walls further include one or more catches or ribs configured to retentively attach to one or more protrusions or bumps on opposing edges of the first section and the second section of the stand arm and thereby fix the slide cover in the locked or unlocked position.

* * * * *